United States Patent

Maruta

[11] Patent Number: 6,074,784
[45] Date of Patent: Jun. 13, 2000

[54] LITHIUM BATTERY

[75] Inventor: Junichi Maruta, Kyoto, Japan

[73] Assignee: Japan Storage Battery Co., Ltd., Kyoto, Japan

[21] Appl. No.: 08/966,979

[22] Filed: Nov. 10, 1997

[30] Foreign Application Priority Data

Nov. 8, 1996 [JP] Japan .................................. 8-312894

[51] Int. Cl.[7] .................................................. H01M 4/52
[52] U.S. Cl. .................... 429/223; 429/231.1; 429/231.3
[58] Field of Search ................................... 423/593, 594; 429/223, 231.1, 231.3

[56] References Cited

U.S. PATENT DOCUMENTS

| | | | |
|---|---|---|---|
| 5,180,574 | 1/1993 | Von Sacken ....................... | 423/594 |
| 5,376,475 | 1/1994 | Ovshinsky et al. ................ | 429/101 |
| 5,630,993 | 5/1997 | Amatucci et al. ................. | 423/594 |

FOREIGN PATENT DOCUMENTS

| | | |
|---|---|---|
| 0 573 040 | 12/1993 | European Pat. Off. ......... H01M 4/48 |
| 0 714 144 | 5/1996 | European Pat. Off. ......... H01M 4/52 |
| 0 730 315 | 9/1996 | European Pat. Off. ......... H01M 4/52 |
| 0 800 222 | 10/1997 | European Pat. Off. ......... H01M 4/52 |
| 56-71276 | 6/1981 | Japan ............................. H01M 4/52 |

OTHER PUBLICATIONS

Patent Abstracts of Japan vol. 012, No. 228 (E–627), Jun. 28, 1988 & JP 63 019760 A (Japan Storage Battery Co Ltd) Jan. 27, 1988, *Abstract.

Zhecheva et al., "New Phase Obtained by Acid Delithiation . . .", Materials Science Forum, vols. 152–153, pp. 259–262. (No Month available), 1994.

B. D. Cullity, "Elements of X–Ray Diffraction, 2nd Edition", Addison–Wesley Publishing, pp. 99–103 and 284–285. (no month available), 1978.

Sakaebe et al., "Cycleability of Ni–Fe hydroxides . . . ", Solid State Ionics, vols. 113–115, pp. 35–41, Dec. 1998.

*Primary Examiner*—Maria Nuzzolillo
*Assistant Examiner*—Carol Chaney
*Attorney, Agent, or Firm*—Sughrue, Mion, Zinn, Macpeak & Seas, PLLC

[57] ABSTRACT

A compound represented by chemical formula: $H_xLi_yNiO_2$ ($0<x\leq1$; $0\leq y<1$; and $0.25\leq(x+y)\leq2$) is used as a positive active material of a lithium battery. The average oxidation number of nickel of the compound varies within a range of from 2.0 to 3.75 with charges and discharges of the battery.

5 Claims, 1 Drawing Sheet

LITHIUM BATTERY

BACKGROUND OF THE INVENTION

1. Field of the Invention

This invention relates to a lithium battery.

2. Description of the Related Art

Accompanying wit the recent development of portable electronic equipments, batteries of higher performance have been demanded. Lithium ion batteries using a carbonaceous material in the negative electrode and lithium cobaltate ($LiCoO_2$), which is a complex oxide having a layer structure, in the positive electrode have been put to practical use as a nonaqueous battery having a high working voltage and a high energy density. Because resources for lithium cobaltate are scarce and expensive, a lithium-containing manganese oxide or lithium nickelate has been proposed as a substitute therefor. A lithium-containing manganese oxide has a low theoretical capacity density, and the capacity decreases with charge and discharge cycles.

On the other hand, lithium nickelate (Li-containing nickel oxide; $LiNiO_2$) is a compound having the same layered crystal structure as lithium cobaltate, having lithium ions intercalated between layers of edge-sharing $NiO_6$ octahedra. Lithium nickelate is generally prepared by mixing a nickel source such as $Ni(NO_3)_2$, $Ni(OH)_2$, $NiCO_3$, $NiO$, and $NiOOH$, and a lithium source such as $LiOH$, $LiNO_3$, $Li_2CO_3$, and $Li_2O_2$, and the mixture is heated at about 600 to 900° C. in an oxygen stream.

However, as reported in Solid State Ionics, Vol. 44, 87 (1990), Chem. Express, 7, 689 (1992) or Dai 33-kai Denchi Toronkai Koen Yoshishu, P. 21 (1992), the structure of lithium nickelate is similar to a rock salt structure so that nickel and a lithium ion are easily exchanged to produce a disordered structure, causing a degradation in capacity.

Use of nickel oxyhydcroxide as a nickel raw material has been attempted. For example, JP-A-63-19760 (the termn "JP-A" as used herein means an "Unexamined Japanese Patent Publication" (kokai)) proposes using nickel oxyhydroxide containing a cobalt of 20 to 75% as an active material for lithium batteries, but the discharge characteristics are not so satisfactory. In order to improve the discharge characteristics, JP-A-6-31045 proposes mixing a hydroxide or oxide containing a trivalent nickel with a lithium salt and heating the mixture. According to the publication, a sodium hydroxide solution having dispersed therein divalent nickel hydroxide ($Ni(OH)_2$) is reacted with an aqueous solution of sodium hypochlorite to prepare nickel oxyhydroxide, and a hydroxide or oxide containing the nickel oxyhydroxide is mixed with lithium nitrate. The mixture is pelletized, dried and heated in air at 600 to 800° C. The mixture is once ground, again pelletized, and heated in air at 700 to 900° C. to prepare lithium nickelate.

These processes utilizing nickel oxyhydroxide encounter difficulty in preparing pure lithium nickelate, and, above all, the resulting lithium batteries have a serious disadvantage that the voltage during charging/discharging process varies in many stages, e.g., 4 stages, and the performance at a higher discharging current also:reduces. Besides, nickel oxyhydroxide must be synthesized as a starting material in order to synthesize lithium nickolate by these processes, which makes the production complicated and incurs cost.

As stated above, lithium nickelate in generally synthesized by mixing a nickel compound and a lithium compound and burning the mixture at a high temperature. However, batteries containing lithium nickelate obtained in this way as a positive active material are unsatisfactory in charge/discharge characteristics and capacity. Further, this process requires equipment enabling high temperature processing. Furthermore, the production steps are complicated and costly depending on starting materials.

Accordingly, there has been a demand for a battery containing a novel positive active material which can be synthesized through a simplified process that can be carried out in low temperature and at low cost Unlike the conventional high temperature processing.

SUMMARY OF THE INVENTION

It is an object of the present invention to provide a battery having a positive active material which can be synthesized through a simplified process that is carried out in low temperature and at low cost.

The lithium battery according to the present invention has a positive active material comprising a compound represented by chemical formula. $H_xLi_yNiO_2$ ($0<x\leq1$; $0\leq y<1$; and $0.25\leq(x+y)\leq2$), the average oxidation number of nickel in the compound varying within a range of from 2.0 to 3.75 with charges and discharges of the battery.

In the lithium battery of the present invention, it is preferable that 0 mol % to 20 mol % or 75 mol % to 90 mol % of nickel of the compound is substituted with cobalt.

In the lithium battery of the present invention, it is also preferable that the compound exhibits a half-value width of $2\theta=0.3°$ or more at the diffraction peak assigned to a (003) plane in the powder X-ray diffraction pattern as measured with CuKα rays.

DETAILED DESCRIPTION OF THE INVENTION

Referring to the accompanying drawings, detailed description of the present invention will be described as follows.

Differing from the conventional lithium batteries containing a lithium complex oxide obtained by high temperature synthesis as a positive active material, a lithium battery according to the present invention having a positive active material composed of a compound represented by chemical formula: $H_xLi_yNiO_2$ ($0<x\leq1$ (preferably $0.75\leq x\leq1$); $0\leq y<1$; and $0.25\leq(x+y)\leq2$) (hereinafter referred to as compound A) and that the average oxidation number of nickel in compound A varies within a range of from 2.0 to 3.75 (preferably 2.0 to 3.25) with charges and discharges of the battery. Compared with the conventional lithium batteries, the lithium battery of the present invention has a higher discharge capacity, and the positive active material used therein can be synthesized through an economical and simplified low-temperature process.

Less than 20 mol % or more than 75 mol % to not more than 90 mol % of nickel of compound A is substituted with cobalt, so that lithium ions diffuse more easily to accelerate the reaction for forming compound A, and the battery has satisfactory cycling performance axid very monotonous discharge characteristics.

Compound A exhibits a half-value width of 2θ=0.3° or more at the diffraction peak assigned to a (003) plane in the powder X-ray diffraction pattern as measured with CuKα rays.

Accordingly, the discharge characteristics become more monotonous.

The present invention will be described in more detail by way of Examples, but the present invention is not limited thereto.

EXAMPLE 1

Nickel hydroxide powder having a particle size of 5 to 50 μm was treated with potassium peroxodisulfate in a 4.5M sodium hydroxide solution at 80° C. to obtain nickel oxyhydroxide as a positive active material A for use in batteries of the present invention.

EXAMPLE 2

$Ni_{0.95}Co_{0.05}(OH)_2$ powder having a particle size of 5 to 50 μm was electrochemically oxidized in a 4.5M sodium hydroxide solution at 80° C. to obtain $H_{0.75}Li_{0.25}Ni_{0.95}Co_{0.05}O_2$ as a positive active material B for use in batteries of the present invention.

Figure 1:
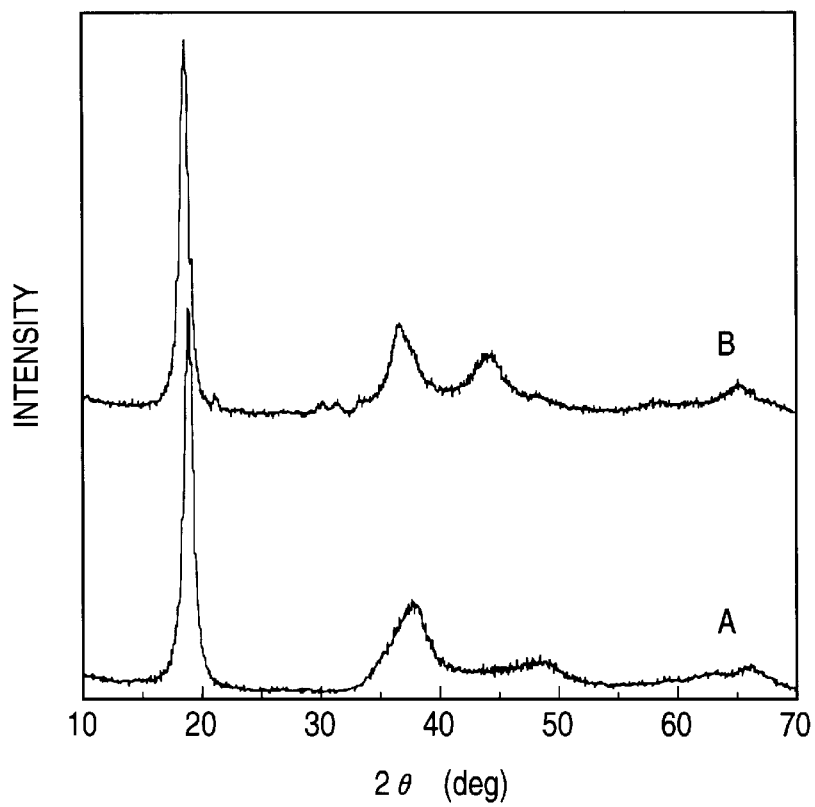
FIG. 1 shows powder X-ray diffraction patterns (CuKα) of positive active materials A and B used in the batteries of the present invention.

Positive active materials A and B prepared in Examples 1 and 2 were examined by powder X-ray diffractometry (CuKα) under conditions of an output voltage of 50 kV, an output current of 200 mA, and a scanning speed of 4°/min. The resulting diffraction patterns are shown in FIG. 1. It can be seen that both patterns (A, B) show a broad peak of a (003) plane the half-value width of which is 0.3° or more in terms of 2θ.

Evaluation:

Batteries were prepared in the following manner.

Each of active materials A and B prepared in Examples 1 and 2 and an active material obtained by a conventional method described later was mixed with 5 wt % of acetylene black as a conducting material and a binder solution of 5 wt % of polyvinylidens difluoride and 3 wt % of N-methyl-2-pyrrolidone in a dry room to prepare a paste. The paste was coated on an aluminum foil as a current collector and dried at 1000° C. to prepare a positive electrode plate having a size of 25 mm×25 mm.

A test battery A or B was assembled by using the above prepared positive electrode plate A or B, two lithium metal plate having the same size of the positive electrode plate as electrodes, and 100 ml of a mixed electrolyte of ethylene carbonate and diethyl carbonate containing 1M lithium perchrolate.

For comparison, lithium nickelate was prepared by heating a mixture of nickel oxyhydroxide and lithium carbonate at 750° C. in an oxygen stream, and a comparative battery C was assembled by using the resulting lithium nickelate as a positive active material in the same manner as describe above.

Figure 2:
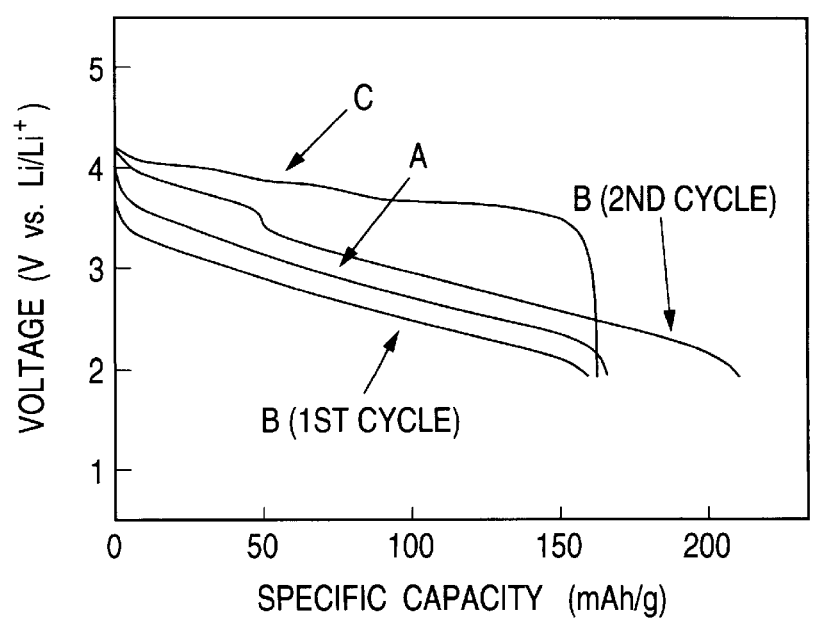
FIG. 2 is a figure showing the discharge characteristics of batteries A and B according to the present invention and a conventional battery C.

Each battery was charged at 25° C. and at a current density of 0.5 mA/cm² to 4.2 V and then discharged at the same current density to 2 V. The discharge characteristics of the batteries A and B according to the present invention are shown in FIG. 2 (measurement started from a discharge). The characteristics of the comparative battery C are also shown in FIG. 2.

Test Results:

It is seen from FIG. 2 that the discharge capacity of the battery B at the first cycle was approximately equal to that of the comparative battery C and that the average battery voltage was descending in the order of C, A, and B. On the other hand, the charge and discharge capacity of the battery B at the second cycle was considerably higher than that of the first cycle. This indicates that the lithiuma ion contained in the active material before the start of a discharge and the lithium ion intercalated into the active material during the first discharge take part in the charge and discharge process. Further, where the active material contains a hydrogen ion, the equilibrium potential is shifted to the plus so that it becomes possible to utilize the region in which metal M has an average oxidation number of 2.0 to 3.0, which region cannot be nade use of by a positive active material containing no proton such as lithium cobaltate or lithium nickelate, in the potential range in which measurement was made. This seems to be one of the causes of the increase in discharge capacity.

The battery according to the present invention is a lithium battery containing compound A represented by chemical formula: $H_xLi_yNiO_2$ ($0<x \leq 1$; $0 \leq y<1$; and $0.25 \leq (x+y) \leq 2$) as a positive active material, the average oxidation number of nickel in compound A varying within a range of from 2.0 to 3.75 with charges and discharges of the battery. It is preferable that less than 20 mol % or 75 mol % to 90 mol % of nickel of compound A is substituted with cobalt. It is also preferable that compound A exhibits a half-value width of 2θ=0.3° or more at the diffraction peak assigned to a (003) plane in the powder X-ray diffraction pattern as measured with CuKα rays.

As described above, the battery of the present invention is equal or superior in discharge capacity to the battery using a conventional positive active material. In addition, the positive active material used in the present invention can be synthesized through an economical and simplified low-temperature process that does not involve a high temperature treatment for the active material. The present invention thus provides an economical and simple process for producing batteries. Accordingly, the present invention has an extremely high industrial value.

What is claimed is:

1. A lithium battery having a positive active material containing a compound represented by chemical formula: $H_xLi_yNiO_2$ ($0<x \leq 1$; $0 \leq y<1$; and $0.25 \leq (x+y) \leq 2$), wherein the average oxidation number of the nickel in said compound varies between 2.0 to 3.75 as the battery is charged and discharged wherein from 75 mol % to 90 mol % of the nickel in said compound is substituted with cobalt.

2. A lithium battery according to claim 1, wherein said compound exhibits a half-value width of 2θ=0.3° or more at a diffraction peak assigned to a (003) plane in a powder X-ray diffraction pattern as measured with CuKα rays under conditions of an output voltage of 50 kV, an output current of 200 mA, and a scanning speed of 4°/min.

3. A lithium battery according to claim 1, wherein said compound exhibits a half-value width of 2θ=0.3° or more at a diffraction peak assigned to a (003) plane in a powder X-ray diffraction pattern as measured with CuKα rays under conditions of an output voltage of 50 kV, an output current of 200 mA, and a scanning speed of 4°/min.

4. A lithium battery having a positive active material containing a compound represented by chemical formula: $H_xLi_yNi_zCo_\alpha O_2$ ($0<x<1$, $0 \leq y<1$, $0.25 \leq (x+y) \leq 2$, $z+\alpha=1$, $0.8 \leq z<1$), wherein the average oxidation number of the nickel in said compound varies between 2.0 to 3.75 as the battery is charged and discharged, wherein said compound exhibits a half-value width of 2θ=0.3° or more at a diffraction peak assigned to a (003) plane in a powder X-ray difraction pattern as measured with CuKα rays.

5. A lithium battery according to claim 4, wherein said compound exhibits a half-value width of $2\theta=0.3°$ or more at a diffraction peak assigned to a (003) plane in a powder X-ray diffraction pattern as measured with CuKα rays under conditions of an output voltage of 50 kV, an output current of 200 mA, and a scanning speed of 4°/min.

* * * * *